April 7, 1942.   W. C. SPEAR   2,278,573
SIGNAL SYSTEM FOR SINGLE-PHASE MOTORS
Filed April 13, 1940
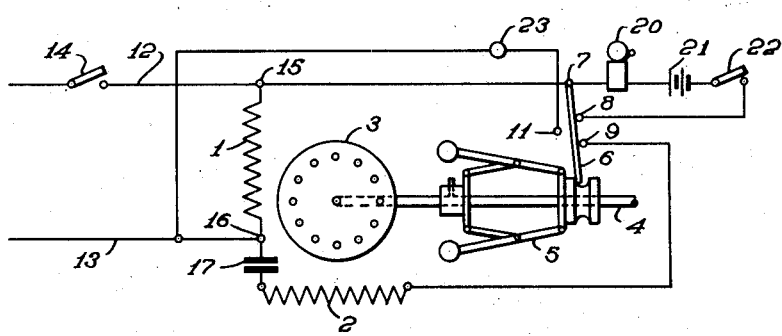
WITNESSES:
Edward Michaels
Wm. C. Groome
INVENTOR
Wendell C. Spear.
BY O.D.Buchanan
ATTORNEY Patented Apr. 7, 1942

2,278,573

UNITED STATES PATENT OFFICE

2,278,573

SIGNAL SYSTEM FOR SINGLE-PHASE MOTORS

Wendell C. Spear, Wapakoneta, Ohio, assignor to Westinghouse Electric & Manufacturing Company, East Pittsburgh, Pa., a corporation of Pennsylvania Application April 13, 1940, Serial No. 329,450

1 Claim. (Cl. 172—279)

My invention relates to a novel alarm-signal system for self-starting single-phase motors, particularly for motors for special applications such as driving the air-circulation and humidification equipment in incubators, where it is essential to provide an alarm-signal in case of failure of either the motor or the power.

An exemplary form of embodiment of my invention is illustrated in the accompanying drawing, the single figure of which is a diagrammatic view of circuits and apparatus embodying the invention.

As shown in the drawing, my invention is applied to a self-starting single-phase induction motor having a primary or stator member carrying a main or running winding 1 and an auxiliary or starting winding 2. The motor is also provided with a squirrel-cage rotor-member 3, or the equivalent, which is mounted on the motor-shaft 4. The motor is also provided with a centrifugal speed-responsive device 5 which is mounted on the motor-shaft 4 and which is adapted to actuate a movable switch-arm 6 from a starting position which it occupies at low motor-speeds, as illustrated, to a running position which it occupies at higher motor-speeds. The switch-arm 6 is illustrated as one which is pivoted at 7, and which makes contact with two back-contacts 8 and 9 in the starting position, and which makes contact with a front-contact 11 in the running position.

Power is supplied to the motor through a single pair of single-phase supply-line conductors 12 and 13 through a control-switch 14. The main winding 1 has its terminals 15 and 16 permanently connected across the supply-line conductors 12 and 13, respectively. The starting winding 2 is connected across said supply-line conductors 12 and 13 through a parallel circuit which may be traced from the supply-line conductor 12 to the switch-pivot 7, the switch-arm 6, the back-contact 9, the auxiliary winding 2, and a capacitor 17, to the other supply-line conductor 13. The particular motor which is illustrated is a capacitor-motor in which a capacitor 17 is serially connected to the starting winding 2, but it should be understood that my invention is equally applicable to a motor of a type in which a capacitor is not associated with the starting winding.

In accordance with my invention, an auxiliary or additional back-contact 8 is provided on the starting-switch 6, and is connected to a terminal of an alarm-circuit which is illustrated as comprising a bell 20, or equivalent alarm or signalling device, a battery 21 or equivalent source of auxiliary power, and a switch 22 for disconnecting the alarm-circuit. The switch 22 can be either manually operated, or interlocked with the control-switch 14 so that both switches may be opened and closed at the same time, if desired. The alarm-circuit is completed by having its other terminal connected to either one of the other two back-contact terminals 7 and 9 of the starting-switch 6.

In accordance with my invention, I alternatively or additionally utilize the front-contact 11, associated with the starting-switch 6, to energize a signal-lamp circuit including a signal-lamp 23 which is energized in a circuit which may be traced from the supply-line conductor 12 to the switch-pivot 7, the switch-arm 6, the front-contact 11 and the lamp 23, to the other supply-line conductor 13.

In operation, when the control-switch 14 is first closed, the motor starts by having both its main or running winding 1 and its auxiliary or starting winding 2 energized, in two parallel circuits connected across the supply-line conductors 12—13, with the starting-switch back-contact terminals 7 and 9 connected in the starting-winding circuit. At a certain intermediate speed of the motor, during the process of its acceleration, the centrifugal speed-responsive device 5 operates and opens the contact between the pair of back-contact terminals 7 and 9, thereby disconnecting the starting winding 2, and causing the motor to continue to operate on its permanent or running circuit-conditions whereby it is operating on only its main winding 1. When the motor stops, either from overload, from a motor-failure, or from a power-failure, the centrifugal switch 5—6 returns to its starting position and reconnects the starting winding 2 across the supply-line conductors 12 and 13.

In accordance with my invention, the same starting-switch 5—6 which connects and disconnects the starting winding 2 of the motor, is utilized to provide a signal indication of the position of the switch, and hence of the speed-condition of the motor, that is, whether the motor is operating above or below a predetermined speed-range at which the centrifugal device 5 operates. In case the motor should stop for any reason whatever, the starting-switch 6 will return to its starting position, making contact with the pair of back-contact terminals 7 and 8 which are connected in the alarm-circuit, thereby energizing the bell 20, or other alarm, and giving the signal that the motor has stopped.

As an added or alternative form of protection, which can be supplied at trifling cost, I have included the front switch-contact 11 and the signal-light 22 which will show the operator when the motor is running. In case of a stoppage of the motor as a result of either a motor-failure or a power-failure, or for any other cause, the signal-light 23 will be shut off, its circuit being opened at 11—6—7 as a result of the centrifugal switch 5—6 being returned to its starting position, thereby giving a visual indication of this abnormal condition by the fact that the indicating light 23 is off.

My alarm-signal system is simpler and less expensive than any similar system which has heretofore been in use, for motors of similar description, and it does not require additional equipment which would increase the overall length of the motor. By utilizing a single starting-switch arm with both an extra set of back-contact terminals, and a set of front-contact terminals, I am enabled to provide a more complete alarm-signal system than has heretofore been utilized, without requiring the addition of any more motor-equipment other than an extra back-contact 8 and a front-contact 11 on the starting switch.

I claim as my invention:

In combination, a self-starting single-phase induction motor having a main winding, an auxiliary winding, a single pair of single-phase supply-line conductors for energizing both of said windings in parallel-circuit relation across said conductors, an alarm-circuit, a signal-lamp circuit, and a centrifugal switch responsive to the motor-speed, said centrifugal switch having a single movable contact-arm, two back-contacts engaged by said contact-arm at low motor-speeds, a front-contact engaged by said contact-arm at higher motor-speeds, said contact-arm being connected to one of said supply-line conductors, said front-contact being connected to one terminal of the signal-lamp circuit, one of said back-contacts being connected to one terminal of the circuit containing said auxiliary winding, and the other back-contact being connected to one terminal of the alarm-circuit.

WENDELL C. SPEAR.